(12) United States Patent
Uehara et al.

(10) Patent No.: US 8,170,604 B2
(45) Date of Patent: May 1, 2012

(54) METHOD AND SYSTEM FOR MANAGING COMMUNICATIONS FOR A MULTI-MODE COMMUNICATIONS DEVICE

(75) Inventors: Glen S. Uehara, Gilbert, AZ (US); Dhiraj P. Gandhi, Plantation, FL (US); Robert A. Hartman, Cooper City, FL (US); Srikumar K. Nayar, Boca Raton, FL (US); Albert S. Steele, Chandler, AZ (US); Fred R. Villa, Gilbert, AZ (US)

(73) Assignee: Motorola Mobility, Inc., Libertyville, IL (US)

( * ) Notice: Subject to any disclaimer, the term of this patent is extended or adjusted under 35 U.S.C. 154(b) by 1347 days.

(21) Appl. No.: 11/426,710

(22) Filed: Jun. 27, 2006

(65) Prior Publication Data

US 2007/0298835 A1 Dec. 27, 2007

(51) Int. Cl.
*H04M 1/00* (2006.01)
(52) U.S. Cl. .............. 455/552.1; 455/574; 455/424; 455/422.1; 455/436
(58) Field of Classification Search ............. 455/552.1, 455/424, 422.1, 574, 436
See application file for complete search history.

(56) References Cited

U.S. PATENT DOCUMENTS

| | | | |
|---|---|---|---|
| 3,846,694 A | 11/1974 | Archer | |
| 3,852,669 A | 12/1974 | Bowman et al. | |
| 4,353,037 A | 10/1982 | Miller | |
| 5,043,672 A | 8/1991 | Youn | |
| 5,204,643 A | 4/1993 | Verronen | |
| 5,235,188 A | 8/1993 | Mul | |
| 5,468,684 A | 11/1995 | Yoshimori et al. | |
| 5,682,404 A | 10/1997 | Miller | |
| 5,884,149 A | 3/1999 | Jaakola | |
| 5,946,619 A * | 8/1999 | Kolev ................. | 455/432.1 |
| 6,064,857 A | 5/2000 | Wiedeman et al. | |
| 6,067,449 A | 5/2000 | Jager | |
| 6,141,706 A | 10/2000 | Thornton et al. | |
| 6,151,509 A | 11/2000 | Chorey | |
| 6,192,230 B1 * | 2/2001 | van Bokhorst et al. .... | 455/343.3 |
| 6,304,748 B1 | 10/2001 | Li et al. | |
| 6,549,625 B1 * | 4/2003 | Rautila et al. ............ | 380/258 |
| 6,668,175 B1 | 12/2003 | Almgren et al. | |
| 6,697,953 B1 | 2/2004 | Collins | |

(Continued)

FOREIGN PATENT DOCUMENTS

WO 0180445 A2 10/2001

(Continued)

OTHER PUBLICATIONS

United States Patent & Trademark Office, "Non-Final Rejection" for U.S. Appl. No. 11/610,592, Feb. 24, 2010, 12 pages.

(Continued)

*Primary Examiner* — Nghi Ly
(74) *Attorney, Agent, or Firm* — Larry G. Brown; Sylvia Chen

(57) ABSTRACT

The invention concerns a method (200) and system (100) for managing communications for a multi-mode communications device (130). The method can include the steps of establishing (210) communications with at least a first wireless network (110) and advising (216) the first wireless network of the multi-mode nature of the multi-mode communications device. As such, the first wireless network can be made aware that the multi-mode communications device is capable of communicating with a second wireless network (120).

19 Claims, 2 Drawing Sheets

U.S. PATENT DOCUMENTS

| | | | |
|---|---|---|---|
| 6,710,651 B2 | 3/2004 | Forrester | |
| 6,744,743 B2 | 6/2004 | Walton et al. | |
| 6,744,813 B1 | 6/2004 | Ko et al. | |
| 6,845,246 B1 | 1/2005 | Steer | |
| 6,909,708 B1 | 6/2005 | Krishnaswamy et al. | |
| 6,960,956 B2 | 11/2005 | Pehlke et al. | |
| 6,985,113 B2 | 1/2006 | Nishimura et al. | |
| 6,987,986 B2 | 1/2006 | Boesen | |
| 7,069,043 B2 | 6/2006 | Sawamura et al. | |
| 7,133,419 B1 | 11/2006 | Hendrichs et al. | |
| 7,134,029 B2 | 11/2006 | Hepner et al. | |
| 7,148,748 B2 | 12/2006 | Apel | |
| 7,187,663 B2 * | 3/2007 | Schmidt | 370/313 |
| 7,221,955 B2 * | 5/2007 | Chen et al. | 455/522 |
| 7,280,505 B2 * | 10/2007 | Chaskar et al. | 370/331 |
| 7,366,142 B2 | 4/2008 | Ngai et al. | |
| 7,525,261 B2 | 4/2009 | Van Zundert et al. | |
| 7,633,898 B2 * | 12/2009 | Jain et al. | 370/328 |
| 8,054,826 B2 | 11/2011 | Cheng et al. | |
| 8,059,702 B2 | 11/2011 | Young et al. | |
| 2002/0101907 A1 | 8/2002 | Dent et al. | |
| 2002/0142791 A1 | 10/2002 | Chen et al. | |
| 2003/0123425 A1 | 7/2003 | Walton et al. | |
| 2003/0149904 A1 | 8/2003 | Kim | |
| 2003/0157954 A1 | 8/2003 | Medvedev et al. | |
| 2003/0208601 A1 * | 11/2003 | Campbell et al. | 709/227 |
| 2004/0108895 A1 | 6/2004 | Wu et al. | |
| 2004/0142715 A1 | 7/2004 | Oses | |
| 2004/0204181 A1 | 10/2004 | Cromer et al. | |
| 2005/0075123 A1 | 4/2005 | Jin et al. | |
| 2005/0195787 A1 | 9/2005 | Madour et al. | |
| 2005/0201321 A1 | 9/2005 | Sinnarajah et al. | |
| 2005/0215206 A1 | 9/2005 | Granstrom et al. | |
| 2005/0240786 A1 | 10/2005 | Ranganathan | |
| 2005/0242879 A1 | 11/2005 | Muller | |
| 2005/0282579 A1 | 12/2005 | Kim | |
| 2006/0003793 A1 | 1/2006 | Ngai et al. | |
| 2006/0067245 A1 | 3/2006 | Pearl | |
| 2006/0084395 A1 | 4/2006 | Kezys et al. | |
| 2006/0194540 A1 | 8/2006 | Hunzinger et al. | |
| 2007/0014260 A1 * | 1/2007 | Seo | 370/331 |
| 2007/0030063 A1 | 2/2007 | Izumi et al. | |
| 2007/0042775 A1 * | 2/2007 | Umatt et al. | 455/434 |
| 2007/0049239 A1 | 3/2007 | Joung et al. | |
| 2007/0135154 A1 | 6/2007 | Gautier et al. | |
| 2007/0285247 A1 | 12/2007 | Forster | |
| 2007/0298835 A1 | 12/2007 | Uehara et al. | |
| 2008/0053207 A1 | 3/2008 | Burgan et al. | |
| 2008/0062912 A1 | 3/2008 | Tiedemann, Jr. et al. | |
| 2008/0102874 A1 | 5/2008 | Gautier et al. | |
| 2008/0118014 A1 | 5/2008 | Reunamaki et al. | |
| 2008/0130727 A1 | 6/2008 | Young et al. | |
| 2008/0130728 A1 | 6/2008 | Burgan et al. | |
| 2008/0146268 A1 | 6/2008 | Gandhi et al. | |
| 2009/0296794 A1 | 12/2009 | Min et al. | |

FOREIGN PATENT DOCUMENTS

| | | |
|---|---|---|
| WO | 2005084057 A1 | 9/2005 |

OTHER PUBLICATIONS

United States Patent & Trademark Office, "Non-Final Rejection" for U.S. Appl. No. 11/467,949, Sep. 3, 2009, 15 pages.

United States Patent & Trademark Office, "Non-Final Rejection" for U.S. Appl. No. 11/553,999, Jul. 9, 2009, 16 pages.

Robert Hartman, "Declaration of Prior Art Reference" for U.S. Appl. No. 11/686,351, Feb. 6, 2007, 2 pages.

United States Patent & Trademark Office, "Final Rejection" for U.S. Appl. No. 11/553,999, Mar. 29, 2010, 18 pages.

United States Patent & Trademark Office, "Non-Final Rejection" for U.S. Appl. No. 11/686,351, Jul. 28, 2010, 15 pages.

United States Patent & Trademark Office, "Non-Final Rejection" for U.S. Appl. No. 11/686,351, Jan. 14, 2011, 17 pages.

Patent Cooperation Treaty, "PCT Search Report and Written Opinion of the International Searching Authority" for International Application No. PCT/US2007/084906, Jul. 16, 2008, 11 pages.

United States Patent & Trademark Office, "Non-Final Rejection" for U.S. Appl. No. 11/686,426, Jan. 25, 2010, 19 pages.

Korean Intellectual Property Office (KIPO), "Notice of Preliminary Rejection" for Korean Application No. 10-2009-7013580, Feb. 28, 2011, 5 pages.

United States Patent & Trademark Office, "Non-Final Rejection" for U.S. Appl. No. 11/686,351, Feb. 26, 2010, 21 pages.

United States Patent and Trademark Office, "Final Rejection" for U.S. Appl. No. 11/686,426, Aug. 2, 2010, 22 pages.

United States Patent and Trademark Office, "Non-Final Office Action Summary" for U.S. Appl. No. 11/610,592, Oct. 14, 2011, 22 pages.

United States Patent and Trademark Office, "Non-Final Rejection" for U.S. Appl. No. 11/686,426 dated Jan. 6, 2012, 46 pages.

* cited by examiner

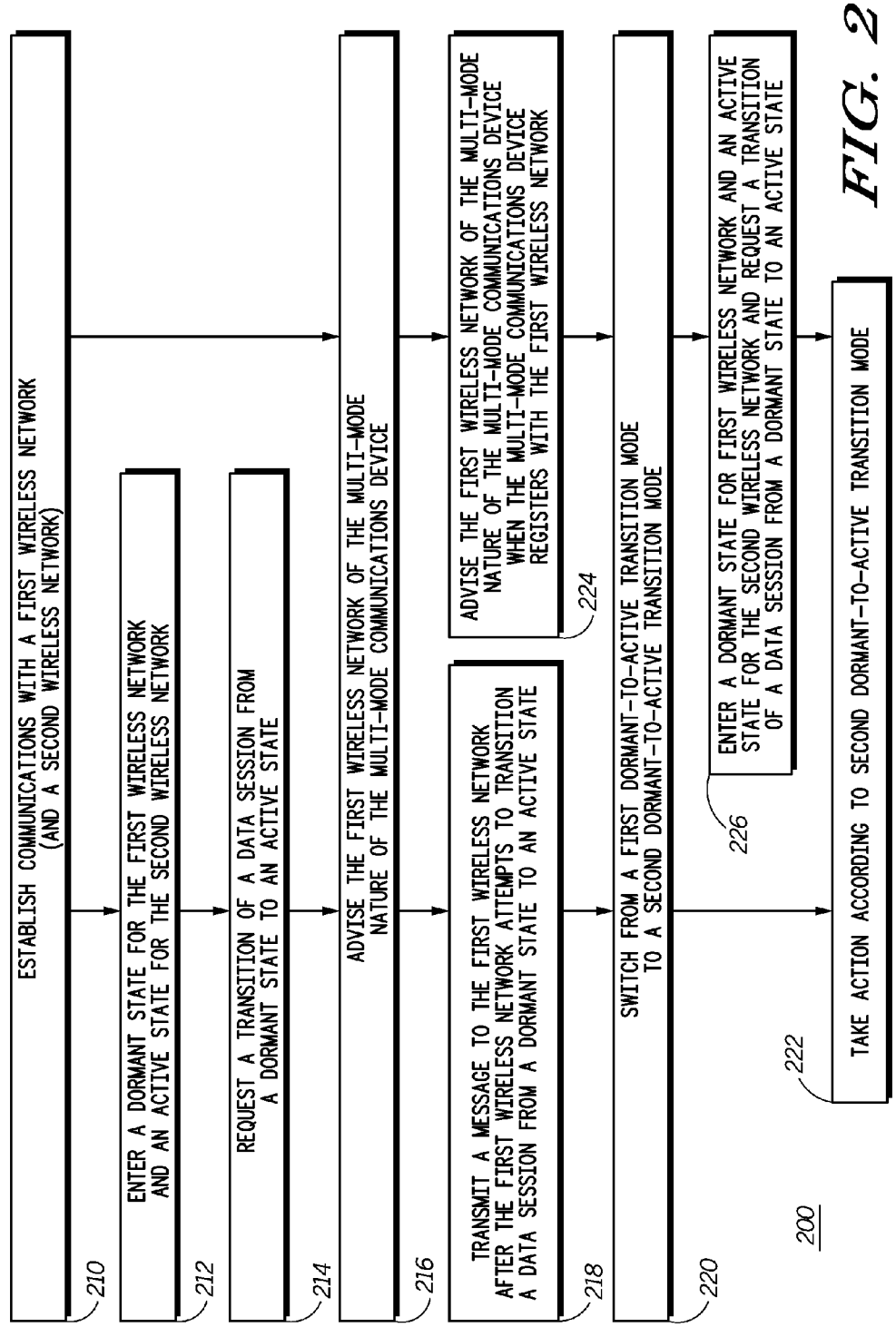

METHOD AND SYSTEM FOR MANAGING COMMUNICATIONS FOR A MULTI-MODE COMMUNICATIONS DEVICE

BACKGROUND OF THE INVENTION

1. Field of the Invention

The present invention concerns the management of communications and more particularly, the management of such communications for a multi-mode communications device.

2. Description of the Related Art

In recent years, mobile communications carriers and manufacturers have pushed for and developed handsets that communicate over a plurality of wireless networks. For example, Motorola of Schaumburg, Ill. has developed a handset that is capable of operating over both an iDEN network and a CDMA network. In view of the current CDMA protocols, however, there may be an issue with a dormant-to-active data transition that is originated from the network.

In particular, the dual-mode handset may be camped on both a CDMA and iDEN network, and as an example, the handset may be receiving over a traffic channel data from the CDMA network. Eventually, the CDMA network may place this data session in a dormant state, such as where there is a period of inactivity in the transmission and receipt of data between the CDMA network and the handset. At this time, the CDMA network will reallocate the traffic channel, although a point-to-point protocol (PPP) connection between the CDMA network and the handset will remain in place.

While the CDMA data session is dormant, the handset may receive a page request from the iDEN network, and the iDEN network will set up a traffic channel. The handset will then begin dispatch communications. While the handset is engaged in a dispatch call, however, the CDMA network may wish to re-establish the data session with the handset because it may have more data to send to the handset. In an effort to transition the data session from a dormant to an active state, the CDMA network may send a page request to the handset. The handset, because it is involved in a dispatch call, will ignore the page request from the CDMA network. The handset ignores the CDMA page request because it will not engage in active communications on two separate networks simultaneously, as its transmission power is controlled to meet specific absorption rate (SAR) guidelines.

The CDMA network may continue to transmit the page requests for a short amount of time and if the handset continues to ignore the requests, will eventually tear down the PPP connection. As a result, the data that was intended to be sent to the handset from the CDMA network may become lost.

SUMMARY OF THE INVENTION

The present invention concerns a method for managing communications for a multi-mode communications device. The method can include the steps of establishing communications with at least a first wireless network and advising the first wireless network of the multi-mode nature of the multi-mode communications device. As such, the first wireless network can be made aware that the multi-mode communications device is capable of communicating with a second wireless network. In addition, in response to being advised, the first wireless network may switch from a first dormant-to-active transition mode to a second dormant-to-active transition mode.

In one arrangement, advising the first wireless network of the multi-mode nature of the multi-mode communications device can include transmitting a message to the first wireless network after the first wireless network attempts to transition a data session from a dormant state to an active state. As an example, the message may indicate to the first wireless network that the multi-mode communications device is busy and to (1) maintain the data session; (2) terminate the data session; (3) send a negative acknowledgement to another party participating in the data session if the data session is to be terminated; (4) maintain the data session for a predetermined amount of time; (5) again attempt to transition the data session from the dormant state to the active state in a predetermined amount of time; or (6) attempt the transition for a predetermined number of tries. Moreover, the predetermined amount of time that the data session is to be maintained and the number of re-attempts to transition the data session from the dormant state to the active state can be greater in magnitude as compared to the message not being sent to the first wireless network.

In another arrangement, advising the first wireless network of the multi-mode nature of the multi-mode communications device can be performed when the multi-mode communications device registers with the first wireless network. Also, the method can include the steps of receiving from the first wireless network a request to transition a data session from a dormant state to an active state and in response, responding to the request and transitioning the data session from the dormant state to the active state. Alternatively, in response, the request can be ignored, which may cause the first wireless network to take action that complies with the second dormant-to-active transition mode.

As an example, establishing communications with at least the first wireless network can include establishing communications with at least the first wireless network and at least a second wireless network. As another example, the first wireless network can be an interconnect wireless system, and the second wireless network may support dispatch communications.

The present invention also concerns another method for managing communications for a multi-mode communications device. This method can include the steps of—in a first wireless network—establishing communications with the multi-mode communications device and in response to the receipt of an indication of the multi-mode nature of the multi-mode communications device, switching from a first dormant-to-active transition mode to a second dormant-to-active transition mode. The second dormant-to-active transition mode can help to maintain a data session if the multi-mode communications device has also established communications with a second wireless network.

The method can also include the step of attempting to transition the data session from a dormant state to an active state, and the indication may be a message received by the first wireless network after the attempt is initiated. Also, the indication may be received by the first wireless network when the multi-mode communications device registers with the first wireless network. As an example, the first wireless network may be an interconnect wireless system, and the second wireless network may support dispatch communications.

The invention also concerns a multi-mode communications device. The device can include a first transceiver for communicating with a first wireless network, a second transceiver for communicating with a second wireless network and a processor communicatively coupled to the first and second wireless networks. In one arrangement, the processor may be programmed to at least instruct the first transceiver to establish communications with the first wireless network to generate an indication for the first wireless network that advises the first wireless network of the multi-mode nature of the multi-mode communications device. As such, the first wireless network can be made aware that the multi-mode communications device is capable of communicating with a second wireless network.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

FIG. 2 illustrates a method for managing communications for the multi-mode communications device in accordance with an embodiment of the inventive arrangements.

DETAILED DESCRIPTION OF THE INVENTION

Figure 1:
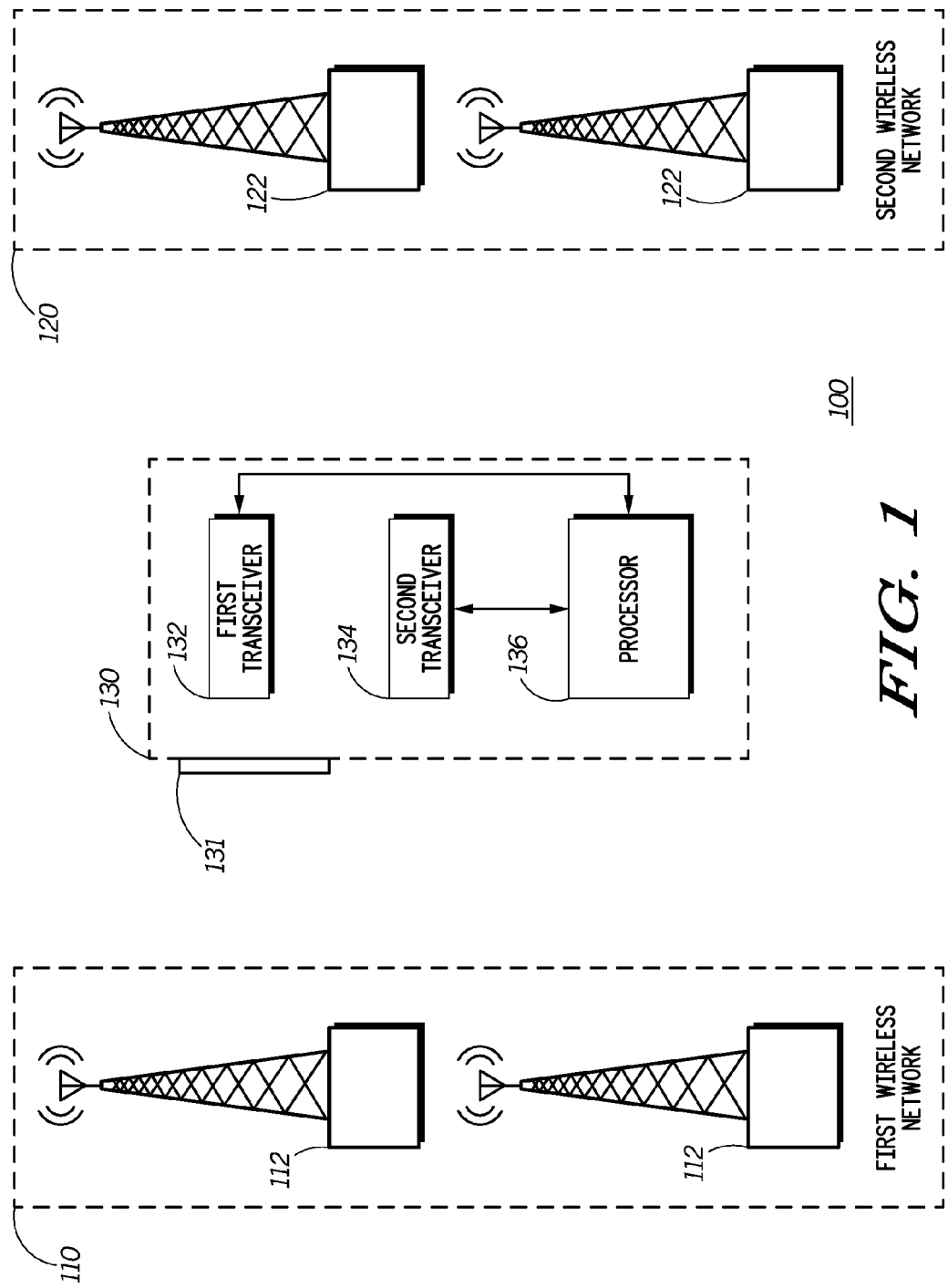
FIG. 1 illustrates a system for managing communications for a multi-mode communications device in accordance with an embodiment of the inventive arrangements.

While the specification concludes with claims defining the features of the invention that are regarded as novel, it is believed that the invention will be better understood from a consideration of the following description in conjunction with the drawings, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled" as used herein, are defined as connected, although not necessarily directly, and not necessarily mechanically. The term "processor" can include any component or group of components, including any relevant hardware and/or software, that can carry out the functions described in relation to the inventive arrangements herein.

The present invention concerns a method and system for managing communications for a multi-mode communications device. The method can include the steps of establishing communications with at least a first wireless network and advising the first wireless network of the multi-mode nature of the multi-mode communications device. As such, the first wireless network can be made aware that the multi-mode communications device is capable of communicating with a second wireless network.

For example, advising the first wireless network of the multi-mode nature of the multi-mode communications device may include transmitting a message to the first wireless network after the first wireless network attempts to transition a data session from a dormant state to an active state. As another example, advising the first wireless network of the multi-mode nature of the multi-mode communications device can be performed when the multi-mode communications device registers with the first wireless network. In either arrangement, once being made aware of the multi-mode nature, the first wireless network can take steps to maintain the data session, rather than merely terminating the session and losing the data.

Referring to FIG. 1, a system 100 for managing communications for a multi-mode communications device is shown. In one arrangement, the system 100 can include a first wireless network 110, a second wireless network 120 and a multi-mode communications device 130 capable of operating in both wireless networks 110, 120. The first wireless network 110 and the second wireless network 120 may be any suitable type of wireless network, so long as they are distinguishable from one another. For example, the first wireless network 110 may have a plurality of base stations 112 and can be an interconnect wireless system, such as one that operates according to a CDMA standard. As another example, the second wireless network 120 can have a plurality of base stations 122 and can support dispatch communications, such as an iDEN network. The multi-mode device 130 may be referred to simply as the device 130. Additionally, the device 130 may include a push-to-talk button 131 to enable the device 130 to participate in a dispatch call. In any event, both the first wireless network 110 and the second wireless network 120 can support voice calls and/or data sessions.

Of course, the invention is not limited to this particular configuration. Specifically, the system 100 can include any suitable number of wireless networks that operate according to any suitable type of standard. Moreover, the networks are not necessarily limited to wide area networks. That is, one of the wireless networks 110,120 may be a short-range wireless network, such as a wireless local area network (WLAN).

In one arrangement, the multi-mode communications device 130 can include a first transceiver 132 for communicating with the first wireless network 110 and a second transceiver 134 for communicating with the second wireless network 120. It is understood, however, that the device 130 can include any suitable number of transceivers for communicating with any suitable number of wireless networks. In addition, the first transceiver 132 and the second transceiver 134 may be separate, discrete components or may actually be part of a single unit with appropriate hardware and software for communicating with a plurality of wireless networks. The term transceiver can mean any component that is capable of at least transmitting wireless signals to or at least receiving wireless signals from a wireless network.

The multi-mode communications device 130 can also include a processor 136, which may be communicatively coupled to the first transceiver 132 and the second transceiver 134. As will be explained below, the processor 136 can execute certain procedures to provide the first wireless network 110 with an indication that the device 130 is a multi-mode unit.

Referring to FIG. 2, a method 200 for managing communications for a multi-mode communications device is shown. When describing the method 200, reference will be made to FIG. 1, although it is understood that the method 200 can be practiced in any other suitable system or device. Moreover, the steps of the method 200 are not limited to the particular order in which they are presented in FIG. 2. The inventive method can also have a greater number of steps or a fewer number of steps than those shown in FIG. 2.

As noted earlier, a first wireless network with which a multi-mode communications device has established communications can be made aware of the multi-mode nature of the device. Although not limited as such, there are at least two ways to carry out this procedure. While there are certain steps that are common to these different processes, the overall flow of the first method is generally on the left side of FIG. 2, and that of the second method is on the right of FIG. 2. The method on the left side will be discussed first.

At step 210, communications can be established with a first wireless network and (optionally) a second wireless network. At step 212, a dormant state for the first wireless network and an active state for the second wireless network can be entered. Moreover, a transition of a data session from the dormant state to the active state can be requested, as shown at step 214.

For example, referring to FIG. 1, the multi-mode device 130 may be capable of operating in both the first wireless network 110 and the second wireless network 120 and can establish communications with both of them. For purposes of this example, the first wireless network 110 may be an interconnect wireless system, and the second wireless network 120 may support dispatch communications. The device 130 may establish a data session with the first wireless network 110 in which any suitable form of data—such as audio, video or text—is transferred to the device 130.

As is common with many data sessions, there may be a break in the transmission of the data, and the data session may move to a dormant state. A dormant state can be defined as a state where there is no physical radio frequency (RF) link between the device 130 and a wireless network, although a logical connection may still exist between the two. An example of this logical link is a PPP connection, although the invention is not limited to such a configuration.

While the data session is in the dormant state, the device 130 may receive a page request from the second wireless network 120. In response, the device 130 may begin dispatch communications with the second wireless network 120. That is, the device 130 may enter an active state with the second wireless network 120. An active state can be defined as a state in which a physical RF link exists between the device 130 and a wireless network. During this time, the first wireless network 110 may wish to send more data to the device 130, and may signal the device 130 to transition the data session from the dormant state to the active state.

Referring back to the method 200 of FIG. 2, at step 216, the first wireless network can be advised of the multi-mode nature of the multi-mode communications device. The term "multi-mode nature" can be defined as any suitable characteristic that may identify the ability of the multi-mode communications device to operate in different wireless networks. This process can enable the first wireless network to be made aware that the multi-mode communications device is capable of communicating with at least a second wireless network. The phrase "made aware that the multi-mode communications device is capable of communicating with a second wireless network" can include any suitable process for informing the first wireless network of the ability of the multi-mode communications device to operate in a different network. This includes both direct and indirect notifications, and several examples will be presented below. For example, at step 218, a message can be transmitted to the first wireless network after the first wireless network attempts to transition the data session from the dormant state to the active state.

Referring once again to FIG. 1, when the first wireless network 110 attempts to transition the data session from the dormant state to the active state, the device 130 can advise the first wireless network 130 of its multi-mode nature. In particular, the processor 136 can generate a message and can instruct the first transceiver 132 to transmit the message to the first wireless network 110. As an example, the message can indicate to the first wireless network 110 that the device 130 is currently busy and to (1) maintain the data session; (2) terminate the data session; (3) send a negative acknowledgement (NACK) to another party participating in the data session if the data session is to be terminated; (4) maintain the data session for a predetermined amount of time; (5) again attempt to transition the data session from the dormant state to the active state in a predetermined amount of time; or (6) attempt the transition for a predetermined number of tries.

The other party participating in the data session can be any entity that is exchanging or has exchanged data with the device 130. Also, maintaining the data session can include maintaining any logical link between the first wireless network 110 and the device 130, such as a PPP connection. Moreover, the predetermined amount of time for maintaining the data session and the predetermined number of tries to attempt the transition can be greater in magnitude than what would be expected if such a message were not sent to the first wireless network 110. That is, the first wireless network 110, if it had not received such an advisement, would tear down the data session and/or cease the transition attempts much faster than what is described here. Of course, the first wireless network 110 may simply maintain the data session until it hears from the device 130 without sending another data session transition request.

It must be noted that the message is not limited to the examples listed above, as the message can include any suitable type of information for advising the first wireless network 110 of the multi-mode nature of the device 130. Moreover, the message does not necessarily have to expressly indicate that the device 130 is a multi-mode device. For example, the message may simply indicate that there is a limited amount of power to perform the data session or connection. This particular indication may serve as a way to advise the first wireless network of the multi-mode nature of the device 130.

Referring back to the method 200 of FIG. 2, at step 220, a switch may occur from a first dormant-to-active transition mode to a second dormant-to-active transition mode. Additionally, at step 222, action can be taken according to the second dormant-to-active transition mode. For example, moving again to FIG. 1, the first wireless network 110, upon receipt of the message from the device 130, can switch from a first dormant-to-active transition mode to a second dormant-to-active transition mode. In particular, the first wireless network 110 can set any suitable number and type of hardware and/or software settings to operate in a mode that takes advantage of the information in the message. For example, the first wireless network 110—in accordance with the information in the message—can reset itself to maintain the data session for a longer period of time and to continue to retry to transition the data session from a dormant mode to an active mode for a longer period of time or a greater number of attempts.

A first dormant-to-active transition mode can be a mode where the first wireless network 110 may follow procedures or protocol in place if the first wireless network 110 is not aware of the multi-mode nature of the multi-mode communication device 130. Conversely, a second dormant-to-active transition mode can be a mode where the first wireless network 110 may follow procedures or protocol in place if it is aware of the multi-mode nature of the device 130. Although the procedures or protocol of the second transition mode may equate the information contained in the message, the invention is not so limited, as the first wireless network 110 can take other appropriate action. This includes actions that are defined solely by the first network 110 or some other entity other than the device 130.

As noted earlier, there are several ways to inform a first wireless network of the multi-mode nature of a multi-mode communication device. Referring back to the method 200 of FIG. 2, another example of how this can be performed will be discussed. At step 224, which can be an example of step 216, the first wireless network can be advised of the multi-mode nature of the multi-mode communications device during the establishment of communications with the first wireless network, such as when the device registers with the network. At step 220, a switch from a first dormant-to-active transition mode to a second dormant-to-active transition mode may occur. At step 226, a transition of a data session from a dormant state to an active state may be requested, and action can be taken according to the second dormant-to-active transition mode, as shown at step 222. As shown in step 226, the transition request may occur after a dormant state for the first wireless network and an active state for the second wireless network have been entered.

For example, referring again to FIG. 1, when the multi-mode communication device 130 registers with the first wireless network 110, the device 130 can inform the first wireless network of its multi-mode nature. This indication can be inserted into any suitable field in the registration sequence. Again, similar to the previous procedure, the indication does not have to expressly indicate that the device 130 is a multi-mode device, as an indirect indication here is within the scope of the invention. Moreover, this process may occur if the device 130 is establishing communications only with the first wireless network 110 or is establishing communications with the first wireless network 110 after the device 130 has already done so with the second wireless network 120.

In response, the first wireless network 110 can switch from a first dormant-to-active transition mode to a second dormant-to-active transition mode, similar to the process previously described. Eventually, the first wireless network 110 may request a transition of a data session from the dormant state to the active state. As an example, the device 130 may be on an active dispatch call with the second wireless network 120 and a data session on the first wireless network 110 may be in a dormant state. As such, the device 1130 may ignore the request. Because it may be in the second dormant-to-active transition mode, the first wireless network 110 may take action according to this transition mode. Examples of such are presented above in relation to the previous procedure. Of course, the device 130 may respond to the request and can transition the data session from the dormant mode to the active mode. This situation may occur if the device 130 is not in an active mode with the second wireless network 120, i.e., not involved in a dispatch call. This process may also apply to the example described above where the device 130 sends the message after the request.

Two ways to accommodate the first wireless network 110 should it determine that it needs to send more data to the device 130 if the device 130 is actively communicating with the second wireless network 120 have been presented. Both examples can help prevent the tearing down of the data session, thereby preventing the loss of important information meant for the device 130. These examples are not mutually exclusive, either, as both methods may be practiced in the same device 130 for the same or different data sessions. It is important to note, however, that the invention is in no way limited to these two particular methods, as other suitable techniques are within the scope of the invention.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for managing communications for a multi-mode communications device, comprising:
   establishing a data session between the multi-mode communications device and at least a first wireless network;
   receiving at the first wireless network, from the multi-mode communications device, and indication of the multi-mode nature of the multi-mode communications device such that the first wireless network is made aware that the multi-mode communications device is capable of communicating with a second wireless network; and
   in response to receiving the indication, the first wireless network switching the data session from a first dormant-to-active transition mode to a second dormant-to-active transition mode, wherein the second dormant-to-active transition mode helps to maintain the data session if the multi-mode communications device has also established communications with a second wireless network.

2. The method according to claim 1, wherein the receiving comprises receiving a message at the first wireless network after the first wireless network attempts to transition the data session from a dormant state to an active state.

3. The method according to claim 2, wherein the message indicates to the first wireless network that the multi-mode communications device is busy and to (1) maintain the data session; (2) terminate the data session; (3) send a negative acknowledgement to another party participating in the data session if the data session is to be terminated; (4) maintain the data session for a predetermined amount of time; (5) again attempt to transition the data session from the dormant state to the active state in a predetermined amount of time; or (6) attempt the transition for a predetermined number of tries.

4. The method according to claim 3, wherein the predetermined amount of time that the data session is to be maintained and the number of re-attempts to transition the data session from the dormant state to the active state are greater in magnitude as compared to the message not being sent to the first wireless network.

5. The method according to claim 1, wherein the receiving is performed when the multi-mode communications device registers with the first wireless network.

6. The method according to claim 5, further comprising:
   receiving from the first wireless network a request to transition the data session from a dormant state to an active state; and
   in response, responding to the request and transitioning the data session from the dormant state to the active state or in response, ignoring the request, which causes the first wireless network to take action that complies with the second dormant-to-active transition mode.

7. The method according to claim 1, wherein establishing the data session comprises establishing communications with at least the first wireless network and at least a second wireless network.

8. The method according to claim 7, wherein the first wireless network is an interconnect wireless system and the second wireless network supports dispatch communications.

9. A method for managing communications for a multi-mode communications device, comprising:
   in a first wireless network, establishing a data session with the multi-mode communications device; and
   in response to a receipt of an indication of the multi-mode nature of the multi-mode communications device by the first communication network, the first wireless network switching the data session from a first dormant-to-active transition mode to a second dormant-to-active transition mode, wherein the second dormant-to-active transition mode helps to maintain the data session with the first communications network, if the multi-mode communications device has also established communications with a second wireless network.

10. The method according to claim 9, further comprising attempting to transition the data session from a dormant state to an active state and wherein the indication is a message received by the first wireless network after the attempt is initiated.

11. The method according to claim 9, wherein the indication is received by the first wireless network when the multi-mode communications device registers with the first wireless network.

12. The method according to claim 9, wherein the first wireless network is an interconnect wireless system and the second wireless network supports dispatch communications.

13. A system of a plurality of wireless networks, comprising:
a first transceiver in a multi-mode communications device for communicating with a first wireless network;
a second transceiver in the multi-mode communications device for communicating with a second wireless network; and
a processor in the multi-mode communications device communicatively coupled to the first and second wireless networks, wherein the processor is programmed to:
at least instruct the first transceiver to establish a data session with the first wireless network; and
generate an indication for the first wireless network that advises the first wireless network of the multi-mode nature of the multi-mode communications device such that the first wireless network is made aware that the multi-mode communications device is capable of communicating with a second wireless network;
wherein, in response to a receipt of the indication of the multi-mode nature of the multi-mode communications device, the first wireless network switching the data session from a first dormant-to-active transition mode to a second dormant-to-active transition mode, and further wherein the second dormant-to-active transition mode helps to maintain the data session if the multi-mode communications device has also established communications with a second wireless network.

14. The system according to claim 13, wherein the processor is further programmed to at least instruct the second transceiver to establish communications with the second wireless network.

15. The system according to claim 13, wherein the processor is further programmed to generate the indication by generating a message for transmission to the first wireless network after the first wireless network attempts to transition the data session from a dormant state to an active state.

16. The system according to claim 15, wherein the generated message indicates to the first wireless network that the multi-mode communications device is busy and to (1) maintain the data session; (2) terminate the data session; (3) send a negative acknowledgement to another party participating in the data session if the data session is to be terminated; (4) maintain the data session for a predetermined amount of time; (5) again attempt to transition the data session from the dormant state to the active state in a predetermined amount of time; or (6) attempt the transition for a predetermined number of tries.

17. The system according to claim 13, wherein the first wireless network is an interconnect wireless system and the second wireless network supports dispatch communications.

18. The system according to claim 13, wherein the processor is further programmed to generate the indication by generating a message for transmission to the first wireless network when the multi-mode communications device registers with the first wireless network.

19. The system according to claim 13, further comprising a push-to-talk button for conducting dispatch communications.

* * * * *